Figure 1:
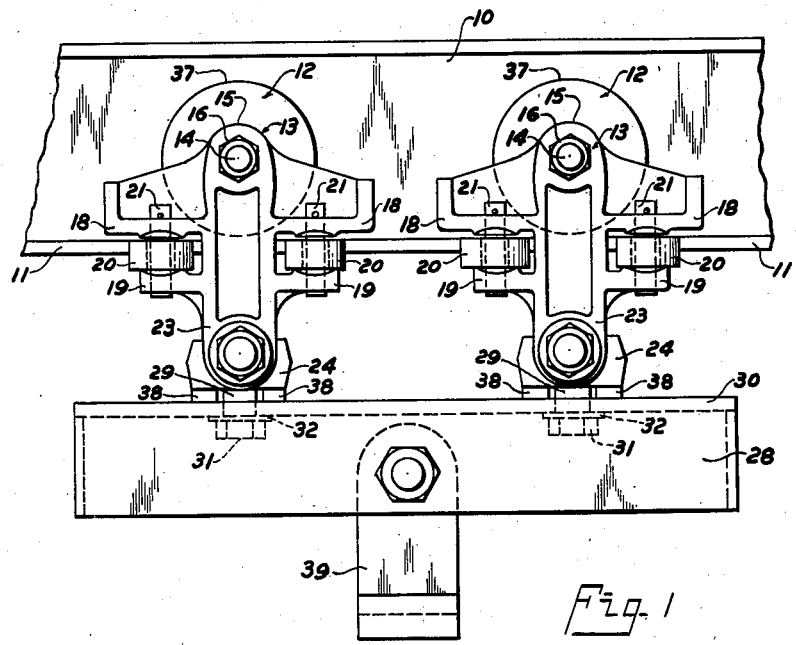

May 10, 1949.  J. B. WEBB ET AL  2,470,060

FOUR-WHEEL TROLLEY BRACKET

Filed June 10, 1946

INVENTORS
JERVIS B. WEBB
ANDREW G. ROSE
BY
Joseph Farley
ATTORNEY.

Patented May 10, 1949

2,470,060

UNITED STATES PATENT OFFICE 2,470,060

FOUR-WHEEL TROLLEY BRACKET

Jervis B. Webb, Bloomfield Hills, and Andrew G. Rose, Detroit, Mich., assignors to Jervis B. Webb Company, Detroit, Mich., a corporation of Michigan Application June 10, 1946, Serial No. 675,521

4 Claims. (Cl. 105—154)

This invention relates to a four wheel overhead trolley assembly and more particularly to a four wheel trolley assembly where each pair of wheels is swivelly mounted to a connecting member whereby each pair of trolley wheels may independently follow the contour of a conveyor track.

A four wheel trolley assembly for supporting a single load has a number of advantages over a trolley assembly comprising a single pair of wheels. Pendulum swinging of the load about the axis of the trolley wheels is thereby avoided as well as the jumping and pulsating movement frequently encountered when a two wheel trolley is used alone. Heavier loads may be supported inasmuch as the total load is divided and transmitted to the supporting track at two points rather than one.

The use of two pairs of trolley wheels as a single assembly usually presents certain problems which is a general object of the present invention to overcome. Since each pair of trolley wheels is located longitudinally at some distance from the other pair, difficulty in rounding curves with relatively small radii is encountered in the four wheel system unless provision is made for each pair of wheels to follow the curvature of the track independently of the other pair.

It is the usual practice to provide the trolley wheels in such installations with an outer flange for engagement with the outer face of the track web of the supporting track on which the trolley wheels are intended to roll. Due to the lateral thrust of these flanges against the side faces of the conveyor track, substantial frictional resistance to movement of the loads along the track results as treads or rims of the wheels do not have a true rolling motion but a sliding action on the tracks with consequent rapid wear on both the horizontal supporting webs and the vertical edges of the track webs as well as rapid wear of the trolley wheels.

The same kind of frictional resistance and wear is also encountered on the straightaway portions of overhead conveyor tracks where the force causing the trolley assembly to move is applied through a lever arm or other device disposed laterally of the center of the track. The torque resulting from such force tends to turn the trolley wheels from their normal straight path causing similar sliding instead of a true rolling action with consequent heavy frictional resistance and wear between the supporting tracks and trolley wheels.

It is the principal object of the present invention to provide an improved construction for a four wheel trolley assembly which will overcome the frictional resistance ordinarily present when a trolley assembly rounds a curve in the conveyor track or when movement is imparted to the assembly from a point laterally disposed of the center of the conveyor track.

Another object of this invention is to provide a swivel construction for attaching each pair of trolley wheels to the load supporting member running between two such pairs of trolley wheels whereby each pair of wheels may independently follow a curve in the conveyor track.

A further object of the invention is to provide an improved construction for a four wheel trolley which will reduce to a minimum the force required to move the assembly along the track.

Still another object of the present invention is to provide a construction which will eliminate entirely any sliding friction between the trolley assembly and the track.

A still further object of the invention is to provide a construction for a trolley assembly wherein any wear to the members contacting the track will be reduced to a minimum.

Another object of the invention is to provide an improved construction for a trolley assembly which will result in maximum stability with respect to its load carrying properties.

A further object of the invention is to provide an extremely simple and economical construction which will provide the above advantages.

These and other objects of the invention will appear more fully from the following description of a particular embodiment of the invention and from an examination of the drawings wherein, Fig. 1 is a side elevation of a four wheel trolley assembly in running position on an I-beam track.

Figure 2:
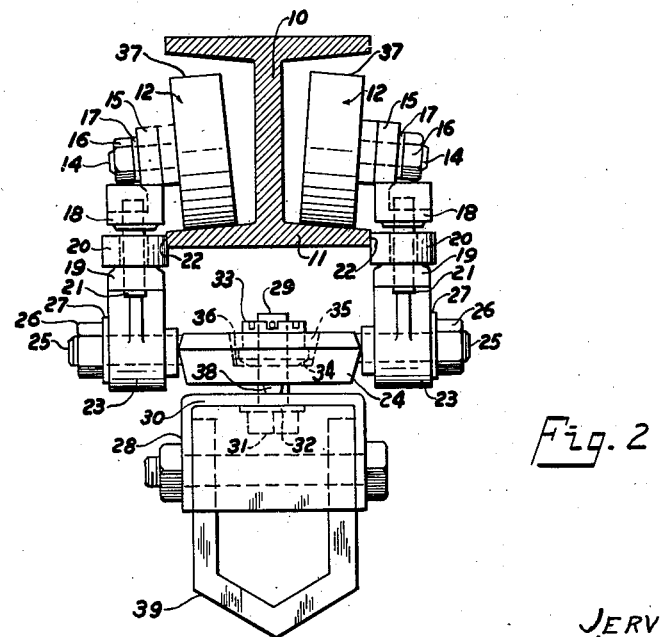

Fig. 2 is an end elevation of the assembly shown in Fig. 1.

In the drawings 10 represents an I-beam structural member serving as a conveyor track, the bottom flange 11 of which provides a surface along which trolley wheels 12 may run. Each of the trolley wheels 12 is rotatably mounted upon a bracket member 13 by means of a bolt 14 suitably adapted to serve as an axle for the trolley wheel 12, the bolt being secured in a boss 15 provided at the upper end of the bracket member 13 and being held in position therein by a nut 16 and lock washer 17. Each of the bracket members 13 is provided with two longitudinally extending upper arms 18 and two lower arms 19 having a space therebetween to accommodate roller wheels 20. Each of said wheels is mounted on a vertical axle 21 passing through an upper arm 18 and a lower arm 19 of the bracket member 13. The rollers 20 are vertically and laterally spaced to contact and roll upon the outside edge 22 of the I-beam 10 on either side.

The lower ends 23 of the bracket members 13 are held in properly spaced lateral relationship with respect to opposing bracket members by a generally cylindrical member 24 having two integrally formed cylindrical extensions or trunnions 25 which pass through the ends 23 of bracket members 13 and are held in position with respect thereto by nuts 26 and lock washers 27. Each of said members 24 is attached to a common load supporting member 28 by means of a suitable swivel joint. Such swivel joint in the present case comprises a bolt 29 extending through the top web 30 of the load supporting member 28 and through the spacing member 24, the load supporting member being held in position by the engagement of the head 31 therewith of bolt 29, an anti-friction washer 32 preferably being interposed between said bolthead and said top web 30. At its upper end, the bolt 29 is provided with a special nut 33 having a rounded face 34 which fits into a recess 35 in the member 24 and rests on the bottom surface 36 of such recess. Longitudinally extending ribs 38 formed in the lower surface of spacing member 24 serve to prevent oscillation of such members about the axis of the cylindrical extensions 25 as well as angular canting of the swivel bolt 29 which might otherwise permit longitudinal shifting of the load supporting member 28 with respect to the trolley bracket members 13. The load supporting member 28 is provided with a U-shaped member 39 preferably disposed centrally between two adjacent pairs of bracket members 13 for attaching a load to the trolley assembly.

The trolley wheels 12 are provided with substantially flat rolling surfaces 37 for maximum contacting surface and wearing qualities and have no flanges for contacting the edges 22 of the flange 11 of the I-beam member 10. Instead, the rollers 20 serve to keep the trolley wheels 12 laterally in correct position on the track. It is to be noted that as the axis of the swivel connection formed by the bolt 29 lies in the same vertical plane as the axis of rotation of the trolley wheels 12 upon the bolts 14 and therefore in the same vertical plane as the points of rolling contact of the wheels 12 with the supporting track 10 and as the wheels 20 are equidistant from the axis of the bolt 29, there can be no possibility for any sliding frictional wear either between the tread of the trolley wheels 12 and the track or between the periphery of the wheels 20 and the vertical side edges of the lower flange 11 of the track 10. Therefore, the only contact between the trolley assemly and the track possible is a rolling contact, all frictional sliding contact being completely eliminated. It will be further noted that each pair of trolley wheels is free to follow a curve in the track independently of the other wheels whereby tracks having relatively sharp turns may be rounded with a minimum of frictional resistance and wear to the trolley members.

While the above description and drawings relate to a particular embodiment of the present invention, it will be readily understood that numerous changes in the detailed construction may be made without departing from the spirit of the invention as described in the following claims.

We claim:

1. A four wheel trolley conveyor assembly for dirigible movement along an overhead conveyor track, said assembly comprising two longitudinally spaced pairs of opposed trolley brackets, each of said brackets having a single load supporting trolley wheel rotatably mounted at its upper end upon a transverse axis, pivotal means for connecting said opposed brackets together at their lower ends in laterally spaced relationship permitting relative articulation of said brackets about a transverse axis, a load supporting member common to said longitudinally spaced pairs of brackets, and a pivotal connection between each opposed pair of said brackets and said member for pivotal movement about a vertical axis.

2. A four wheel trolley conveyor assembly for dirigible movement along a conveyor track, said assembly comprising two longitudinally spaced pairs of opposed trolley brackets, each of said brackets having a single load supporting trolley wheel rotatably mounted at its upper end about a transverse axis and a load supporting member dependingly supported by said longitudinally spaced pairs of brackets, said assembly being characterized by a connection between opposed trolley brackets permitting relative articulation of said brackets about a transverse axis, and a pivotal connection between said load supporting member and each pair of opposed trolley brackets for relative articulation therebetween about a vertical axis.

3. A four wheel trolley conveyor assembly comprising two longitudinally spaced pairs of opposed trolley brackets, a transverse member pivotally connected to the lower ends of each pair of opposed trolley brackets providing for relative articulation between said opposed brackets about a transverse axis, and a load supporting member dependingly supported from said transverse members.

4. A four wheel trolley assembly as set forth in claim 3 wherein the supporting connection between each transverse member and the load supporting member is a pivotal connection providing for relative articulation therebetween about a vertical axis.

JERVIS B. WEBB.
ANDREW G. ROSE.

REFERENCES CITED

The following references are of record in the file of this patent:

UNITED STATES PATENTS

| Number | Name | Date |
|---|---|---|
| 667,868 | Cook | Feb. 12, 1901 |
| 874,367 | Moore | Dec. 17, 1907 |
| 876,486 | Pfaffenbach | Jan. 14, 1908 |
| 927,994 | Moore | July 13, 1909 |
| 953,448 | True | Mar. 29, 1910 |
| 1,336,370 | Neller | Apr. 6, 1920 |
| 1,420,112 | Krump | June 20, 1922 |
| 1,734,175 | McCabe | Nov. 5, 1929 |
| 2,168,986 | Harris | Aug. 8, 1939 |
| 2,318,354 | Anjeskey | May 4, 1943 |